United States Patent
Hung

(10) Patent No.: US 9,729,335 B2
(45) Date of Patent: Aug. 8, 2017

(54) METHOD FOR REMOTELY ACCESSING DATA AND LOCAL APPARATUS USING THE METHOD

(71) Applicant: Acer Incorporated, New Taipei (TW)

(72) Inventor: Lun-Yu Hung, New Taipei (TW)

(73) Assignee: Acer Incorporated, New Taipei (TW)

(*) Notice: Subject to any disclaimer, the term of this patent is extended or adjusted under 35 U.S.C. 154(b) by 215 days.

(21) Appl. No.: 14/695,055

(22) Filed: Apr. 24, 2015

(65) Prior Publication Data

US 2015/0334206 A1 Nov. 19, 2015

(30) Foreign Application Priority Data

May 13, 2014 (TW) .............................. 103116864 A

(51) Int. Cl.

| | |
|---|---|
| *H04L 12/12* | (2006.01) |
| *H04L 29/06* | (2006.01) |
| *H04L 29/08* | (2006.01) |
| *G06F 1/32* | (2006.01) |
| *G06F 3/06* | (2006.01) |
| *G06F 11/20* | (2006.01) |

(52) U.S. Cl.
CPC .............. *H04L 12/12* (2013.01); *G06F 1/32* (2013.01); *G06F 1/3278* (2013.01); *G06F 3/0625* (2013.01); *G06F 3/0634* (2013.01); *G06F 11/2074* (2013.01); *G06F 11/2087* (2013.01); *H04L 67/1095* (2013.01); *H04L 67/40* (2013.01); *Y02B 60/34* (2013.01)

(58) Field of Classification Search
CPC .. G06F 3/0625; G06F 3/0634; G06F 11/2074; G06F 11/2087; G06F 1/3278
USPC .............. 711/162, E12.103; 341/50; 710/65; 713/320; 709/217
See application file for complete search history.

(56) References Cited

U.S. PATENT DOCUMENTS

| | | | |
|---|---|---|---|
| 9,092,150 B2* | 7/2015 | Yerushalmi | ........... G06F 3/0625 |
| 2011/0035562 A1* | 2/2011 | Gaither | ............... G06F 11/2074 |
| | | | 711/162 |
| 2011/0148672 A1* | 6/2011 | Ventura Domingo | .............. G06F 1/3278 |
| | | | 341/50 |

* cited by examiner

Primary Examiner — Kyung H Shin
(74) Attorney, Agent, or Firm — Jianq Chyun IP Office

(57) ABSTRACT

A method for remotely accessing data and a local apparatus using the method are provided. An embedded controller determines whether a power management state of the local apparatus is switched to a power saving state when the embedded controller receives a remote control signal through a network unit from a cloud server. The embedded controller activates a first switch unit to switch, such that data received from the network unit is transferred to a storage unit.

14 Claims, 6 Drawing Sheets

METHOD FOR REMOTELY ACCESSING DATA AND LOCAL APPARATUS USING THE METHOD

CROSS-REFERENCE TO RELATED APPLICATION

This application claims the priority benefit of Taiwan application Ser. No. 103116864, filed on May 13, 2014. The entirety of the above-mentioned patent application is hereby incorporated by reference herein and made a part of this specification.

BACKGROUND OF THE INVENTION

1. Field of the Invention

The invention generally relates to a mechanism for remotely accessing data, and more particularly, to a method for remotely accessing data and a local apparatus under a power saving state.

2. Description of Related Art

In general, if desires to use a home-based host computer as a server, then the home-based host computer needs to be constantly in a power-on state so that connectable devices, such as Tablet PC and Smartphone, can connect to the home-based host computer at any time. However, the said approach is very energy-consuming. Therefore, in order to conserve energy, the home-based host computer is turned-off until it is desired to be accessed, and then a Wake-on-LAN (Local Area Network, LAN) technology is adopted for turning-on the host computer.

According to different hardware and software equipments, the Wake-on-LAN technology may also includes remote mechanisms such as remote command for shutting down the host computer, remote command for restarting the host computer and so forth. However, the Wake-on-LAN technology may often experience a problem of not being supported by a network card or network chip of the host computer.

SUMMARY OF THE INVENTION

The invention provides a method for remotely accessing data and a local apparatus, whereby a cloud server when still access a storage unit of the local apparatus when the local apparatus is under a power saving state.

The method for remotely accessing data of the invention is adapted to remotely access the storage unit of the local apparatus through the cloud server. The local apparatus further includes a network unit, an embedded controller and a system control chip. A first switch unit is disposed in the local apparatus. The first switch unit is coupled to the storage unit, the system control chip and the embedded controller. The embedded controller determines whether a data received by the network unit is to be transferred through the first switch unit to the system control chip or to the storage unit. In the present method, the embedded controller receives a remote control signal through the network unit from the cloud server. When receiving the remote control signal, the embedded controller determines whether a power management state of the local apparatus has already been switched to a power saving state. Under the power saving state, power supply to the system control chip is stopped, and the embedded controller obtains the control of the local apparatus. Under a condition of being determined as already switched to the power saving state, the embedded controller activates the first switch unit to switch, so that the data may be transferred to the storage unit through the first switch unit.

The local apparatus of the invention includes a network unit, an embedded controller, a system control chip and a first switch unit. The network unit is configured to communicate with the cloud server. The embedded controller is coupled to the network unit, so as to receive a remote control signal from the cloud server. The first switch unit is coupled to the storage unit, the embedded controller, the system control chip and the network unit, and is configured to determine whether a data received by the network unit is to be transferred to the system control chip or the storage unit. When the embedded controller receives the remote control signal through the network unit from the cloud server, and under a condition that a power management state of the local apparatus is already switched to a power saving state whereby power supply to the system control chip is stopped, the embedded controller activates the first switch unit to switch, so that the data is transferred to the storage unit through the first switch unit.

In an embodiment of the invention, the storage unit is, for example, a memory card, and the local apparatus further includes a second switch unit, a first bridge and a second bridge. The second switch unit is coupled to the system control chip and the embedded controller. The first bridge is coupled between the first switch unit and the second switch unit. The second bridge is coupled between the second switch unit and the memory card. Under the condition of being determined as already switched to the power saving state, the embedded controller activates the first switch unit to switch, so that the data is transferred to the first bridge through the first switch unit, and the embedded controller activates the second switch unit to switch, so that the data transferred via the first bridge is transferred to the memory card through the second switch unit.

In an embodiment of the invention, the local apparatus further includes a firmware unit and a peripheral switch unit. The firmware unit is coupled to the system control chip and the embedded controller. The peripheral switch unit is coupled between the system control chip and the embedded controller, and is coupled to an audio output interface, a video output interface and a light-emitting unit interface. When the firmware unit determines that the power management state has never been switched to a working state within a time segment under the power saving state, and when a preset time point is reached, the firmware unit outputs a first signal to the system control chip to wake up the system control chip, so that the system control chip is able to access the memory card, and the firmware unit outputs a second signal to the embedded controller, so that the embedded controller, after disabling the audio output interface, the video output interface and the light-emitting unit interface via the peripheral switch unit, activates an operating system. Under a condition that the operating system is activated, the system control chip transfers all the data in the memory card into a built-in storage through the second switch unit and deletes the data in the memory card, wherein the built-in storage is coupled to the system control chip, and after the data in the memory card is deleted, the power management state is switched to the power saving state.

In an embodiment of the invention, when the power management state is a working state, the embedded controller activates the first switch unit to switch, so that the data is transferred to the system control chip through the first switch unit, and the embedded controller activates the second switch unit to switch, so that system control chip accesses the memory card through the second switch unit. If the system control chip detects that a remaining capacity of the memory card is smaller than a default capacity, the system control chip transfers all the data in the memory card to a built-in storage coupled to the system control chip and deletes the data in the memory card.

In an embodiment of the invention, the storage unit is, for example, a built-in storage, and then local apparatus further includes a second switch unit, a third switch unit, a first bridge and a third bridge. The third switch unit is coupled to the built-in storage. The first bridge is coupled between the first switch unit and the second switch unit. The third bridge is coupled between the second switch unit and the third switch unit. Under the condition of being determined as already switched to the power saving state, the embedded controller activates the first switch unit to switch, so that the data is transferred to the first bridge through the first switch unit. Moreover, the embedded controller activates the second switch unit to switch, so that the data transferred via the first bridge is transferred to the third bridge through the second switch unit. In addition, the embedded controller activates the third switch unit to switch, so that the data transferred via the third bridge is transferred to the built-in storage through the third switch unit.

In an embodiment of the invention, when the power management state is under a working state, the embedded controller activates the first switch unit to switch, so that the data is transferred to the system control chip through the first switch unit, and the embedded controller activates the third switch unit to switch, so that the system control chip accesses the built-in storage through the third switch unit.

In view of the foregoing, when accessing the local apparatus through the cloud server, a client apparatus can access the storage unit of the local apparatus under the power saving state without requiring the use Wake-on-LAN technology to wake up the entire local apparatus, and thereby not only saves the energy but also enhances an efficiency of use.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following embodiments, a client apparatus, after connected to a network, may remotely access a data from a local apparatus through a cloud server. The client apparatus is, for example, a Smart Phone, a Tablet PC, a Notebook Computer, or a Personal Computer. When the client apparatus logins into the cloud server and desires to remotely access the local apparatus, the cloud server sends a remote control signal to the local apparatus, such that the local apparatus may activate its internal related components according to a power management state at the time, and thereby enables the cloud server to successfully access the storage unit of the local apparatus.

First Embodiment

Figure 1:
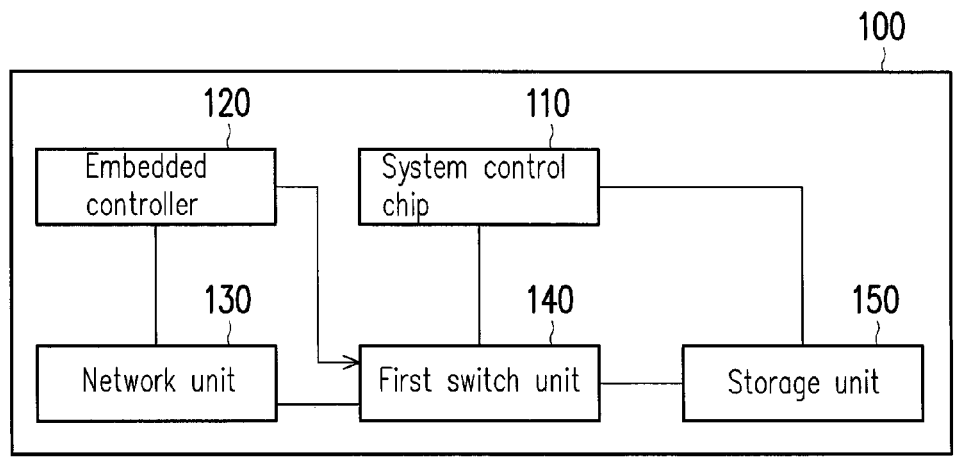
FIG. 1 is a block diagram illustrating a local apparatus according to a first embodiment of the invention.

FIG. 1 is a block diagram illustrating a local apparatus according to a first embodiment of the invention. Referring to FIG. 1, a local apparatus 100 includes a system control chip 110, an embedded controller 120, a network unit 130, a first switch unit 140 and a storage unit 150. The storage unit 150 is, for example, a built-in storage or a memory card.

The system control chip 110 is coupled to the first switch unit 140 and the storage unit 150. Herein, the system control chip 110 is, for example a System on Chip (SOC) integrated with functions of a Central Processing Unit (CPU) and a Platform Controller Hub (PCH). In other embodiments, the system control chip 110 may, for example, be a PCH coupled to a CPU.

The embedded controller 120 is coupled to the network unit 130 and the first switch unit 140. The embedded controller 120 is configured to receive a remote control signal transferred from the cloud server through the network unit 130, and is configured to control the first switch unit 140.

Herein, when a power management state of the local apparatus 100 is a working state, the system control chip 110 obtains the control of the local apparatus 100. When the power management state of the local apparatus 100 is switched to a power saving state, the system control chip 110 is not supplied with power, and then the embedded controller 120 obtains the control of the local apparatus 100. For instance, regardless whether the local apparatus 100 is turned on or off, under a condition that the local apparatus 100 is plugged to electricity, the embedded controller 120, the network unit 130 and the first switch unit 140 are all in a state of having weak power supply. This weak power supply enables the network unit 130 to maintain a minimum operational capability, so that the network unit 130 can listen to broadcast information from an external network. And, only when the power management state of the local apparatus 100 is in the working state, the system control chip 110 would be supplied with power. In terms of Advanced Configuration and Power Interface (ACPI) standard, the working state is a S0 state, and the power saving state is a S3 state, a S4 state or a S5 state.

The first switch unit 140 is coupled to the storage unit 150, the embedded controller 120, the system control chip 110 and the network unit 130. The first switch unit 140 is being controlled according to the embedded controller 120, so as to determine whether the data received by the network unit 130 is to be transferred to the system control chip 110 or the storage unit 150. That is, the embedded controller 120 controls a switching of the first switch unit 140 so as to determine whether to cut off the connection between the system control chip 110 and the network unit 130. For instance, under the working state, the system control chip 110 is connected with the network unit 130 through the first switch unit 140; and under the power saving state, the embedded controller 120 controls the first switch unit 140 to switch, thereby cutting off the connection between the system control chip 110 and the network unit 130, so that the storage unit 150 may be connected to the network unit 130 through the first switch unit 140.

Under the power saving state, the system control chip 110 is in a non-functional condition, and thus the embedded controller 120 may be used to active the internal related components of the local apparatus 100, so that the cloud server can successfully access the local apparatus 100. Details regarding a method for remotely accessing data, accompanied with the local apparatus 100, are described in the following below.

Figure 2:
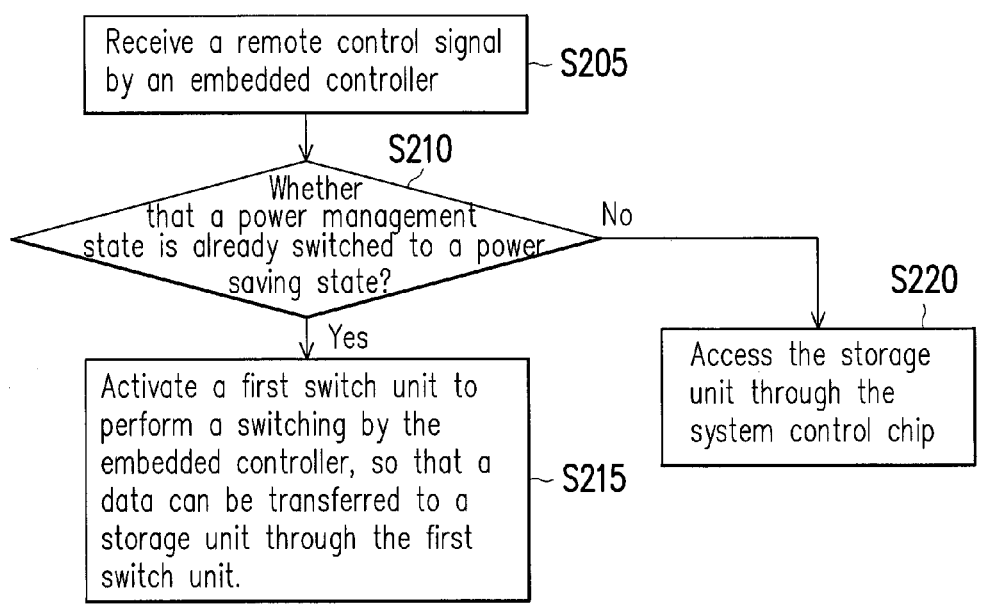
FIG. 2 is a flow chart illustrating a method for remotely accessing data according to the first embodiment of the invention.

FIG. 2 is a flow chart illustrating a method for remotely accessing data according to the first embodiment of the invention. Referring to FIG. 1 and FIG. 2 at the same time, in step S205, the embedded controller 120 receives a remote control signal through the network unit 130 from the cloud server. For instance, when the client apparatus logins into the cloud server and desires to data access the local apparatus 100, the cloud server transfers the remote control signal to the local apparatus 100.

When the embedded controller 120 receives the remote control signal through the network unit 130, in step S210, the embedded controller 120 determines whether that the power management state is already switched to the power saving state. If it is already switched to the power saving state, then step S215 is executed; if it is in the working state instead of being switched to the power saving state, then step S220 is executed.

In step S215, the embedded controller 120 activates the first switch unit 140 to switch, so that the data received by the network unit 130 can be transferred to the storage unit 150 through the first switch unit 140. When the embedded controller 120 determines that the power management state is already switched to the power saving state, since the system control chip 110 is currently not supplied with power, the system control chip 110 is unable to access the storage unit 150; and therefore, by using the embedded controller 120 to send a control signal to the first switch unit 140, the first switch unit 140 is switched to cut off the connection between the system control chip 110 and the network unit 130, so as to establish the connection between the network unit 130 and the storage unit 150, thereby enabling a data received by the network unit 130 to be transferred to the storage unit 150 through the first switch unit 140.

If the power management state is in the working state when the embedded controller 120 receives the remote control signal, then in step S220, the storage unit 150 is accessed by the system control chip 110. For instance, under the working state, the first switch unit 140 establishes the connection between the network unit 130 and the system control chip 110, so that the data received by the network unit 130 can be transferred to the system control chip 110 through the first switch unit 140, thereby enabling the system control chip 110 to access the storage unit 150.

In the following, a second embodiment and a third embodiment are respectively provided for illustrating two conditions: when the storage unit 150 is a memory card, and when the storage unit 150 is a built-in storage (e.g., a hard disk).

Second Embodiment

Figure 3A:
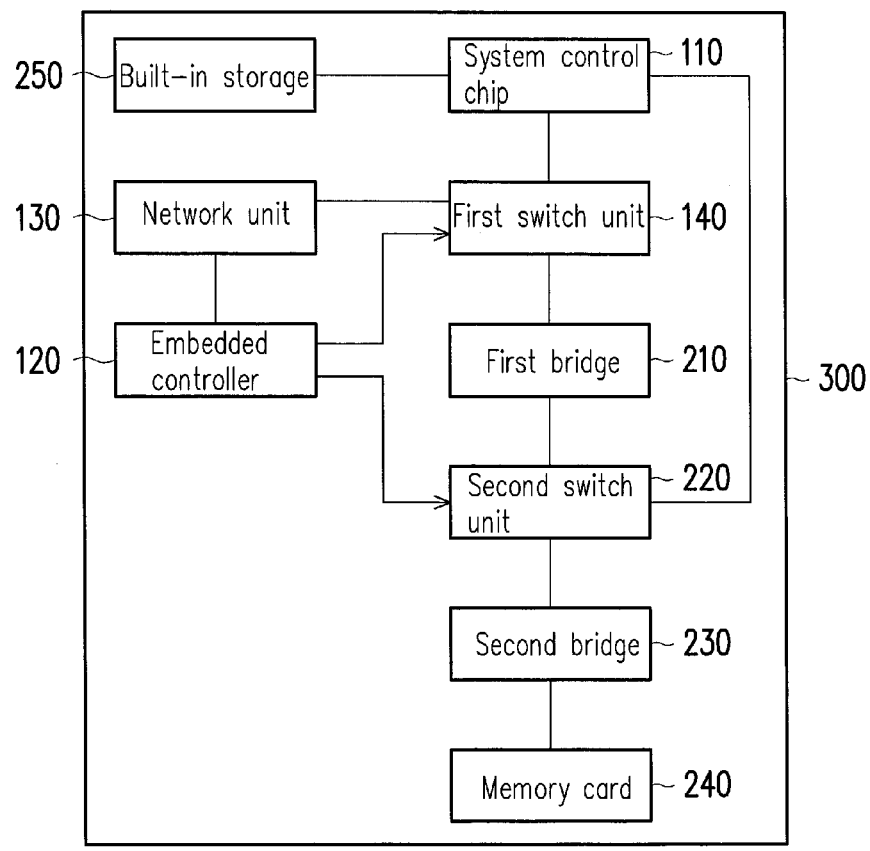
FIG. 3A and FIG. 3B are block diagrams illustrating a local apparatus according to a second embodiment of the invention.
Figure 3B:
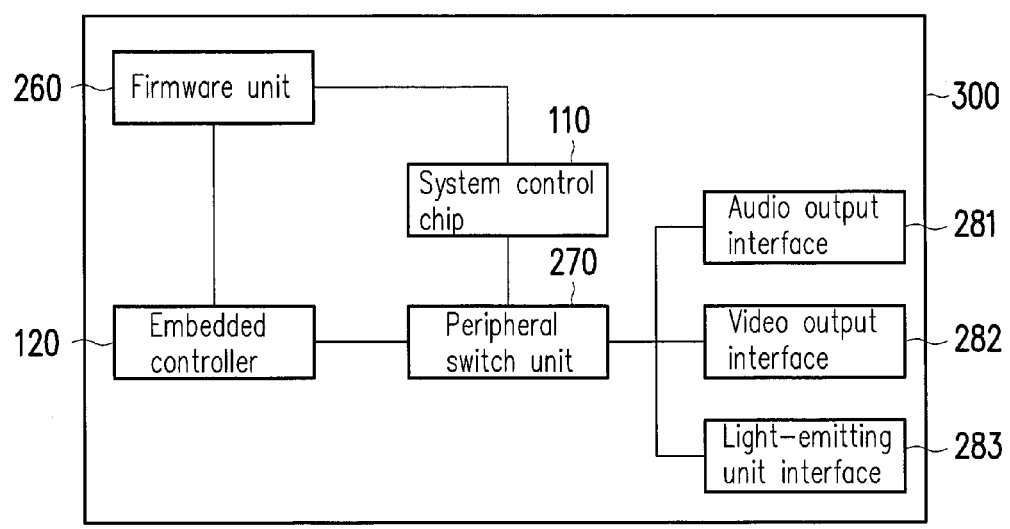

FIG. 3A and FIG. 3B are block diagrams illustrating a local apparatus according to a second embodiment of the invention. Herein, the storage unit 150 of the first embodiment is replaced by a memory card 240, components having the same functions as the ones described in the first embodiment are labelled with the same reference numerals, and related descriptions thereof are omitted. Referring to FIG. 3A, a local apparatus 300 includes the system control chip 110, the embedded controller 120, the network unit 130, the first switch unit 140, a first bridge 210, a second switch unit 220, a second bridge 230, the memory card 240 and a built-in storage 250. Herein, the memory card 240 is, for example, a secure digital memory card (simply refers to as SD card). The built-in storage 250 is, for example, a hard disk.

The embedded controller 120 is coupled to the first switch unit 140 and the second switch unit 220 through a general purpose input output (GPIO) interface. The first switch unit 140 is coupled to the network unit 130, the system control chip 110 and the first bridge 210 through a peripheral component interconnect express (PCIE) interface. The second switch unit 220 is coupled to the first bridge 210, the second bridge 230 and the system control chip 110 through a universal serial bus (USB). The second bridge 230 is coupled to the memory card 240 through a serial peripheral interface (SPI). The system control chip 110 is coupled to the built-in storage 250 through a serial advanced technology attachment (SATA) interface.

In FIG. 3B, a local apparatus 300 further includes a firmware unit 260, a peripheral switch unit 270, an audio output interface 281, a video output interface 282 and a light-emitting unit interface 283. The firmware unit 260 is coupled to the system control chip 110 and the embedded controller 120. The firmware unit 260 is, for example, a basic input/output system (BIOS). The peripheral switch unit 270 is coupled between the system control chip 110 and the embedded controller 120, and is coupled to the audio output interface 281, the video output interface 282 and the light-emitting unit interface 283.

In the second embodiment, the first bridge 210 is coupled between the first switch unit 140 and the second switch unit 220, and is responsible for decoding and encoding, so that the data transferred through the PCIE interface is converted into USB format after being re-coded. The second bridge 230 is coupled between the second switch unit 220 and the memory card 240, and is responsible for decoding and encoding, so that the data transferred through the USB is converted into SPI format after being re-coded.

When the embedded controller 120 receives the remote control signal through the network unit 130 from the cloud server, and under the condition that the power management state of the local apparatus 300 is already switched to the power saving state, the embedded controller 120 respectively outputs control signals via the corresponding GPIO interface to activate the first switch unit 140 and the second switch unit 220 to switch.

Figure 4:
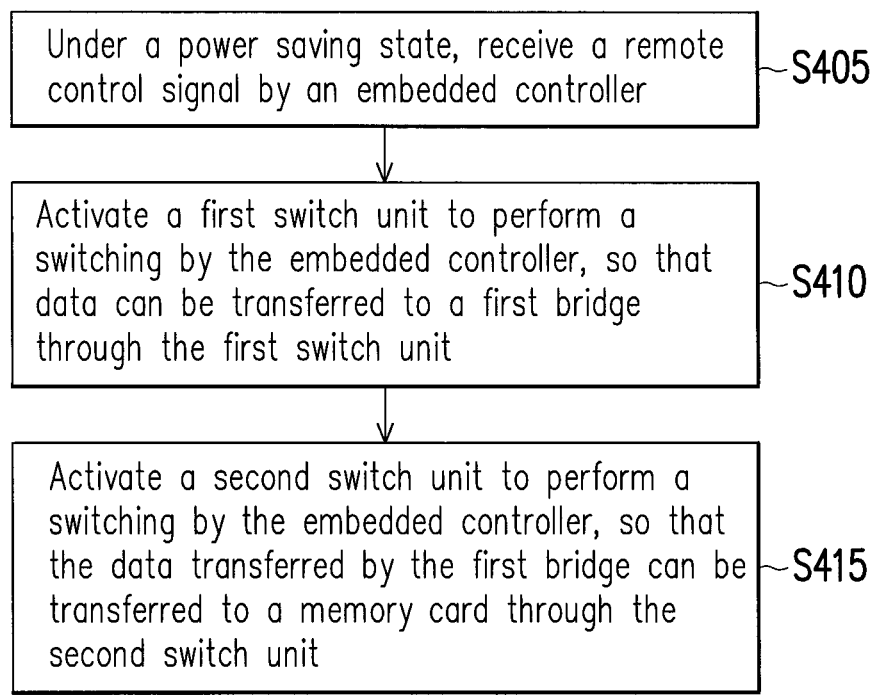
FIG. 4 is a flow chart illustrating a method for remotely accessing data according to the second embodiment of the invention.

For instance, FIG. 4 is a flow chart illustrating a method for remotely accessing data according to the second embodiment of the invention. Herein, under the condition that the power management state of the local apparatus 300 is in the working state, the first switch unit 140 establishes the connection between the network unit 130 and the system control chip 110, and the second switch unit 220 establishes a connection between the system control chip 110 and the second bridge 230, so that the system control chip 110 can access the memory card 240. While, under the condition that the power management state of the local apparatus 300 is switched to the power saving state, the embedded controller 120 respectively activates the first switch unit 140 and the second switch unit 220 to switch, so that the data received by the network unit 130 can be directly transferred to the memory card 240.

Referring to FIG. 3A and FIG. 4 at the same time, in step S405, under the power saving state, the embedded controller 120 receives the remote control signal. Then, in step S410, the embedded controller 120 activates the first switch unit 140 to switch, so that data can be transferred to the first bridge 210 through the first switch unit 140. Moreover, in step S415, the embedded controller 120 activates the second switch unit 220 to switch, so that the data transferred by the first bridge 210 can be transferred to the memory card 240 through the second switch unit 220.

In detail, when the embedded controller 120 receives the remote control signal under the power saving state, the embedded controller 120 sends a control signal to the first switch unit 140, so that the first switch unit 140 establishes a connection between the network unit 130 and the first bridge 210. Moreover, the embedded controller 120 sends another control signal to the second switch unit 220, so that the second switch unit 220 establishes a connection between the first bridge 210 and the second bridge 230. Accordingly, under the power saving state, the data received by the network unit 130 may thus be transferred through the first switch unit 140, the first bridge 210, the second switch unit 220 and the second bridge 230 to the memory card 240.

Figure 5:
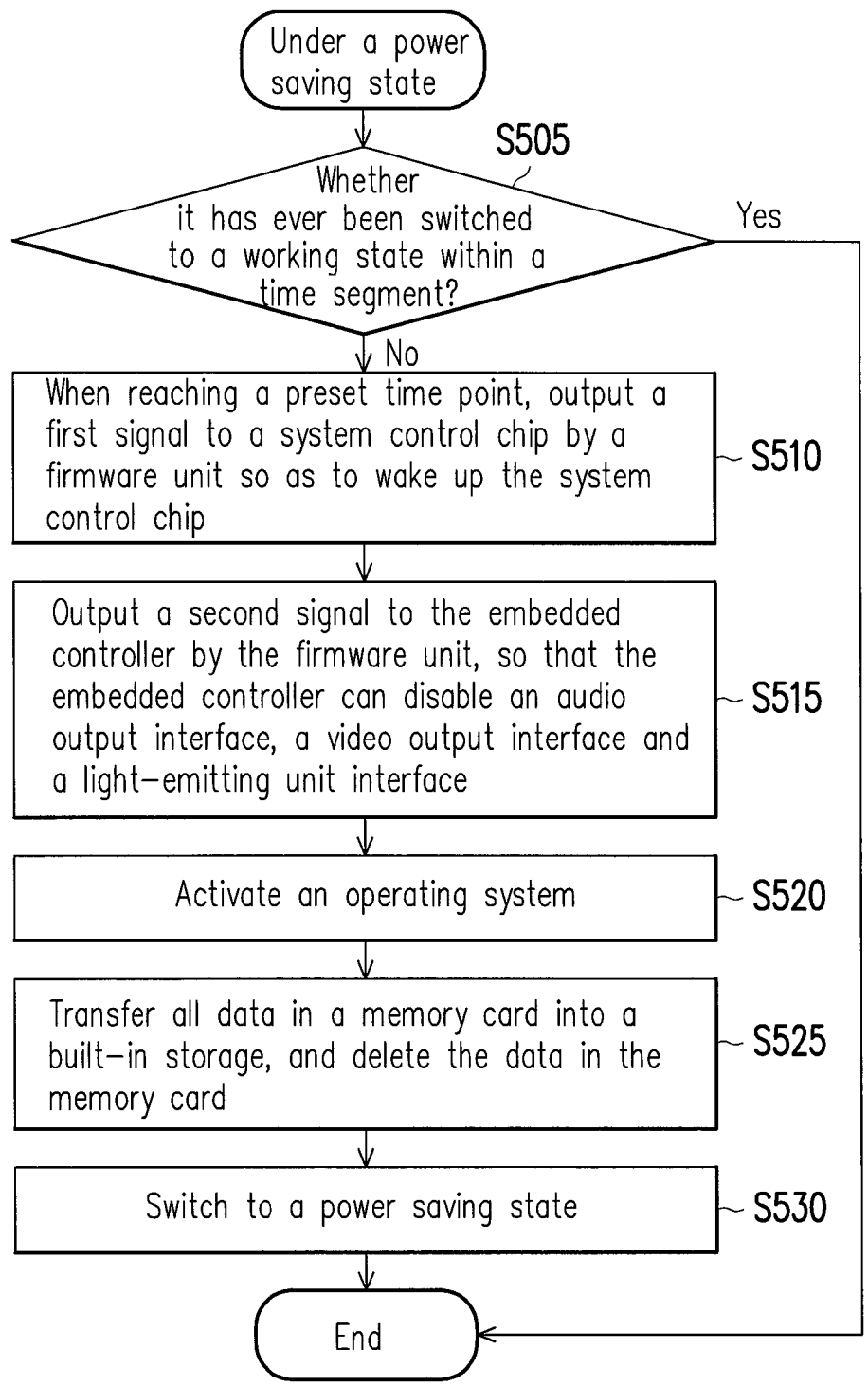
FIG. 5 is a flow chart illustrating a data transport storage method under a power saving state according to the second embodiment of the invention.

In addition, under the power saving state, whether to execute a data transport storage action may further be determined. The following provides an example for further illustration. FIG. 5 is a flow chart illustrating a data transport storage method under a power saving state according to the second embodiment of the invention. Referring to FIG. 3B and FIG. 5 at the same time, in step S505, under the power saving state, the firmware unit 260 of the local apparatus 300 determines whether the power management state has ever been switched to the working state within a time segment. For instance, the time segment is set between midnight at the start (00:00) and the end (24:00), daily. The firmware unit 260 determines whether the local apparatus 300 has ever been switched to the working state between 0:00-24:00.

If the local apparatus 300 has been switched to the working state within the time segment, then the data transport storage action will not be executed. Namely, if local apparatus 300 has been switched to the working state within the set time segment, then the system control chip 110 would automatically executes the data transport storage action under the working state, so that the data stored in the memory card 240 under the power saving state may be transferred and stored into the built-in storage 250.

If the local apparatus 300 has never been switched to the working state within the set time segment, then step S510 to step S530 are executed, so as to transfer and store the data in the memory card 240 to the built-in storage 250.

In step S510, when reaching a preset time point (e.g., 24:00/midnight), the firmware unit 260 outputs a first signal to the system control chip 110 to wake up the system control chip 110, so as to switch to the working state, and then the system control chip 110 may access the memory card 240. Herein, in order to prevent the local apparatus 300 from frightening its user when the local apparatus 300 automatically boots up, step S515 is executed while waking up the system control chip 110.

In step S515, the firmware unit 260 outputs a second signal to the embedded controller 120, so that the embedded controller 120 can disable an audio output interface 281, a video output interface 282 and a light-emitting unit interface 283. In detail, the embedded controller 120 outputs a control signal to the peripheral switch unit 270, so that the peripheral switch unit 270 cut off a connection between the system control chip 110 and audio output interface 281, a connection between the system control chip 110 and the video output interface 282 and a connection between the system control chip 110 and the light-emitting unit interface 283.

Afterward, in step S520, the system control chip 110 activates an operating system. Since the connections between the system control chip 110 and the audio output interface 281, the video output interface 282 and the light-emitting unit interface 283 are cut off, no sound would be produced, no image would be shown on screen, and also no light would be emitted when activating the operating system.

Moreover, in step S525, under the condition that the system control chip 110 activates the operating system, the system control chip 110 transfers all the data in the memory card 240 through the second switch unit 220 into the built-in storage 250, and delete the data in the memory card 240. After deleting the data in the memory card 240, in step S530, the power management state is switched to the power saving state. For instance, if the data is transferred and stored under the S5 state, then the local apparatus 300 would be shutdown after the data transport storage action is completed; and if the data is transferred and stored under the S3 state, then the local apparatus 300 would be switched back to the S3 state after the data transport storage action is completed.

In addition, under the condition of entering the operating system, the data transport storage action may also only be automatically performed when a capacity of the memory card 240 is insufficient. For instance, under the condition that the power management state is in the working state, the embedded controller 120 activates the first switch unit 140 to switch, so that the data can be transferred to the system control chip 110 through the first switch unit 140. Moreover, the embedded controller 120 activates the second switch unit 220 to switch, so that the system control chip 110 can access the memory card 240 through the second switch unit 220. Under the working state, the system control chip 110 checks whether a remaining capacity of the memory card 240 is smaller than a default capacity (e.g., 500 MB). If the remaining capacity is smaller than the default capacity, then the system control chip 110 would automatically transfer all the data in the memory card 240 to the built-in storage 250 (e.g., a hard disk) that is coupled to the system control chip 110, and delete the data in the memory card 240. If the remaining capacity is not smaller than the default capacity, then the system control chip 110 would not automatically perform the data transport storage action.

Third Embodiment

Figure 6:
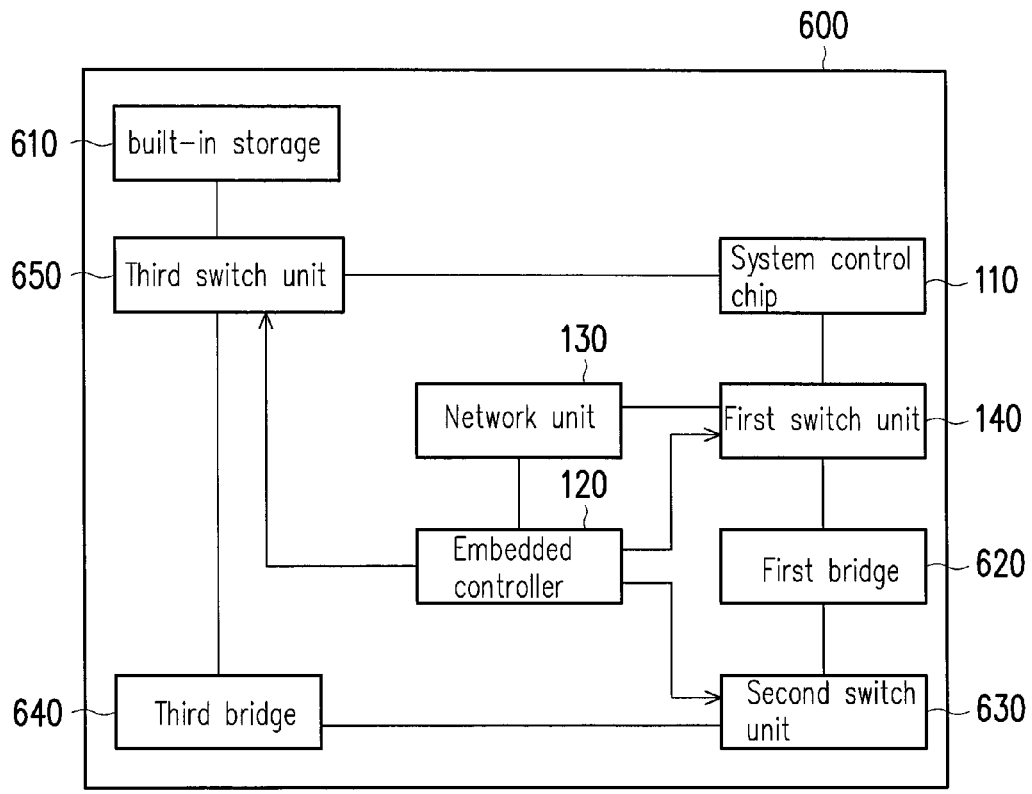
FIG. 6 is a block diagram illustrating a local apparatus according to a third embodiment of the invention.

FIG. 6 is a block diagram illustrating a local apparatus according to a third embodiment of the invention. Herein, the storage unit 150 of the first embodiment is replaced by a built-in storage 610, components having the same functions as the ones described in the first embodiment are labelled with the same reference numerals, and related descriptions thereof are omitted. Referring to FIG. 6, a local apparatus 600 includes the system control chip 110, the embedded controller 120, the network unit 130, the first switch unit 140, the built-in storage 610, a first bridge 620, a second switch unit 630, a third bridge 640 and a third switch unit 650.

The embedded controller 120 is coupled to the first switch unit 140, the second switch unit 630 and the third switch unit 650 through the GPIO interface. The first switch unit 140 is coupled to the network unit 130, the system control chip 110 and the first bridge 620 through the PCIE interface. The second switch unit 630 is coupled to the first bridge 620 and the third bridge 640 through the USB. The third switch unit 650 is coupled to the system control chip 110, the built-in storage 610 and the third bridge 640 through the SATA interface.

In the third embodiment, the first bridge 620 is coupled between the first switch unit 140 and the second switch unit 630, and is responsible for decoding and encoding, so that the data transferred through the PCIE interface is converted into USB format after being re-coded. The third bridge 640 is coupled between the second switch unit 630 and the third switch unit 650, and is responsible for decoding and encoding, so that the data transferred through the USB is converted into SATA format after being re-coded.

Under the condition that the embedded controller 120 receives the remote control signal through the network unit 130 from the cloud server, and the power management state of the local apparatus 600 is already switched to the power saving state, the embedded controller 120 respectively outputs control signals via the corresponding GPIO interface to activate the first switch unit 140, the second switch unit 630 and the third switch unit 650 to switch.

Figure 7:
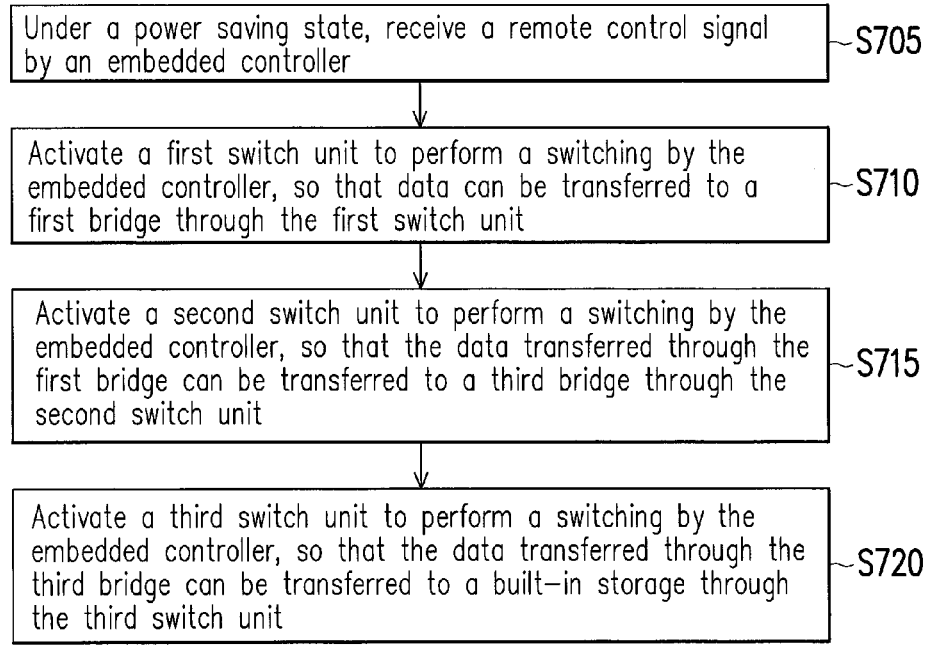
FIG. 7 is a flow chart illustrating a method for remotely accessing data according to the third embodiment of the invention.

For instance, FIG. 7 is a flow chart illustrating a method for remotely accessing data according to the third embodiment of the invention. Herein, under the condition that the power management state of the local apparatus 600 is in the working state, the first switch unit 140 establishes the connection between the network unit 130 and the system control chip 110, and the third switch unit 650 establishes a connection between the system control chip 110 and the built-in storage 610, so that the system control chip 110 can access the built-in storage 610. While, under the condition that the power management state of the local apparatus 600 is switched to the power saving state, the embedded controller 120 respectively activates the first switch unit 140, the second switch unit 220 and the third switch unit 650 to switch, so that the data received by the network unit 130 can be directly transferred to the built-in storage 610 without passing through the system control chip 110.

Referring to FIG. 6 and FIG. 7, in step S705, under the power saving state, the embedded controller 120 receives the remote control signal. Then, in step S710, the embedded controller 120 activates the first switch unit 140 to switch, so that the data can be transferred to the first bridge 620 through the first switch unit 140. That is, the embedded controller 120 sends a control signal to the first switch unit 140 for enabling the first switch unit 140 to establish a connection between the network unit 130 and the first bridge 620.

In step S715, the embedded controller 120 activates the second switch unit 630 to switch, so that the data transferred through the first bridge 620 can be transferred to the third bridge 640 through the second switch unit 630. That is, the embedded controller 120 sends a control signal to the second switch unit 630 for enabling the second switch unit 630 to establish a connection between the first bridge 620 and the third bridge 640.

In step S720, the embedded controller 120 activates the third switch unit 650 to switch, so that the data transferred through the third bridge 640 can be transferred to the built-in storage 610 through the third switch unit 650. That is, the embedded controller 120 sends a control signal to the third switch unit 650 for enabling the third switch unit 650 to cut off the connection between the system control chip 110 and the built-in storage 610, and to establish a connection between the third bridge 640 and the built-in storage 610.

Accordingly, under the power saving state, the data received by the network unit 130 may sequentially be transferred through the first switch unit 140, the first bridge 620, the second switch unit 630, the third bridge 640 and the third switch unit 650 to the built-in storage 610.

Fourth Embodiment

Figure 8:
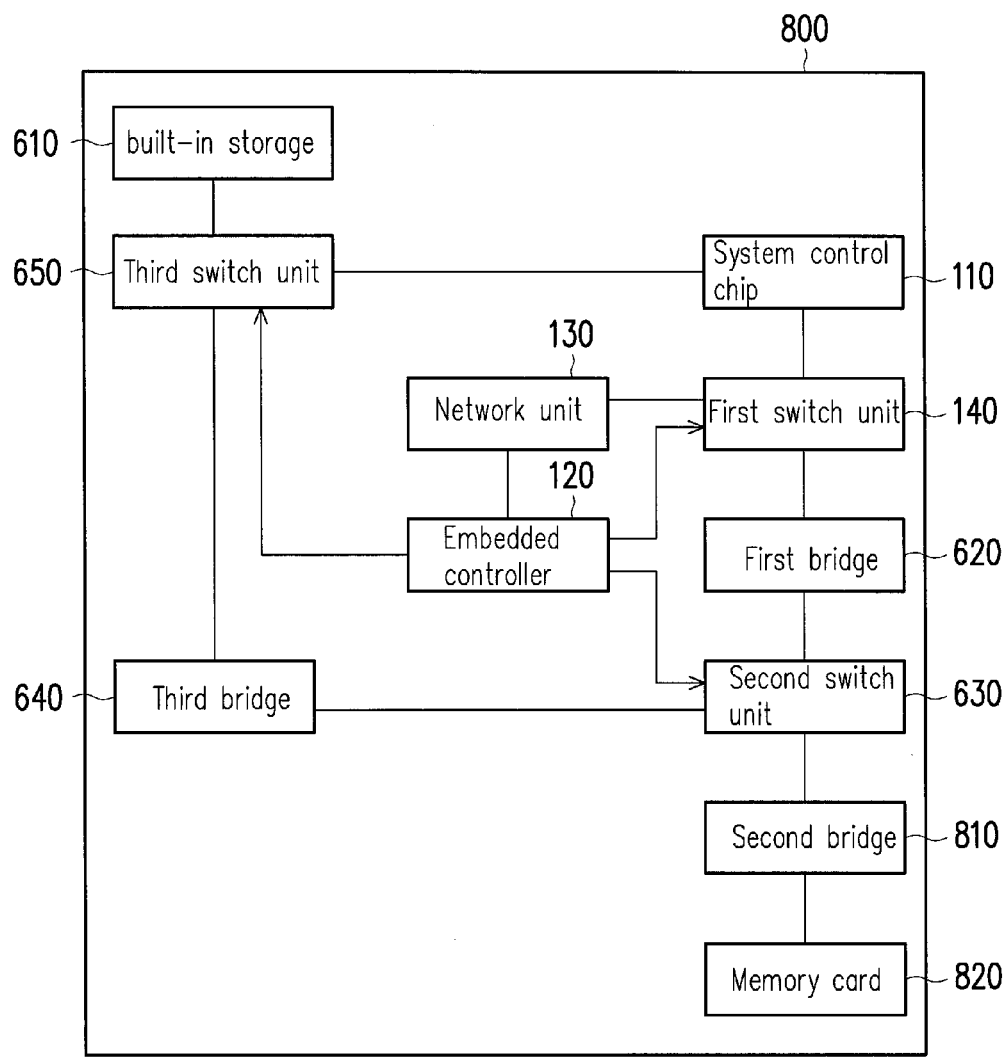
FIG. 8 is a block diagram illustrating a local apparatus according to a fourth embodiment of the invention.

FIG. 8 is a block diagram illustrating a local apparatus according to a fourth embodiment of the invention. In the fourth embodiment, a local apparatus 800 has a memory card 820 and a built-in storage 610 at the same time. When the client apparatus desires to access the local apparatus 800 through the cloud server, the client apparatus may decide to access the memory card 820 or the built-in storage 610 based on the user's selection. Herein, components having the same functions as the ones described in the first embodiment and the third embodiment are labelled with the same reference numerals, and related descriptions thereof are omitted.

Referring to FIG. 8, the local apparatus 800 includes the system control chip 110, the embedded controller 120, the network unit 130, the first switch unit 140, the built-in storage 610, the first bridge 620, the second switch unit 630, the third bridge 640, the third switch unit 650, a second bridge 810 and a memory card 820.

The embedded controller 120 is coupled to the first switch unit 140, the second switch unit 630 and the third switch unit 650 through the GPIO interface. The first switch unit 140 is coupled to the network unit 130, the system control chip 110 and the first bridge 620 through the PCIE interface. The second switch unit 630 is coupled to the first bridge 620, the second bridge 810 and the third bridge 640 through the USB. The third switch unit 650 is coupled to the system control chip 110, the built-in storage 610 and the third bridge 640 through the SATA interface. The memory card 820 is coupled to the second bridge 810 through the SPI.

In the fourth embodiment, under the power saving state, the second switch unit 630 establishes a connection between the first bridge 620 and the second bridge 810. Accordingly, under the power saving state, the data received by the network unit 130 is stored into the memory card 820. Details regarding accessing the memory card 820 under the power saving state may be referred to the second embodiment, and thus will not be repeated herein. Moreover, under the working state, the second switch unit 630 establishes a connection between the second bridge 810 and the third bridge 640. Accordingly, each time when switching to the working state, the data in the memory card 820 can automatically be transferred into the built-in storage 610 through the third switch unit 650. Moreover, under the working state, the data in the built-in storage 610 may further be transferred into the memory card 820 through the third switch unit 650.

When the user of the client apparatus decides to access the memory card 820, under the power saving state, the embedded controller 120 respectively sends control signals to the first switch unit 140 and the second switch unit 630 via the corresponding GPIO interface, so as to establish the connection between the network unit 130 and the first bridge 620 and a connection between the first bridge 620 and the second bridge 810.

When the user of the client apparatus decides to access the built-in storage 610, under the power saving state, the embedded controller 120 respectively sends control signals to the first switch unit 140, the second switch unit 630 and the third switch unit 650 via the corresponding GPIO interface, so as to establish the connection between the network unit 130 and the first bridge 620, the connection between the first bridge 620 and the third bridge 640, and to establish a connection between the third bridge 640 and the built-in storage 610.

Moreover, under the working state, the system control chip 110 accesses the memory card 820 or the built-in storage 610.

In summary, when the client apparatus accesses local apparatus through the cloud server, by disposing a switch unit between the system control chip and the storage unit, and using the embedded controller to control the switching of the switch unit to establish the connection between the network unit and the storage unit, the data from the network unit can be transferred to the storage unit without passing through the system control chip. Accordingly, the storage unit of the local apparatus may be accessed under the power saving state without requiring the use Wake-on-LAN technology to wake up the entire local apparatus, and thereby not only saves the energy but also enhances an efficiency of use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for remotely accessing data, adapted to remotely access a storage unit of a local apparatus through a cloud server, wherein the local apparatus further comprises a network unit, an embedded controller and a system control chip, the method comprises:
  receiving a remote control signal through the network unit from the cloud server by the embedded controller and controlling a first switch unit of the local apparatus so as to determine whether to cut off a connection between the system control chip and the network unit by the first switch unit, wherein the first switch unit is coupled to the storage unit, the system control chip and the embedded controller;
  when receiving the remote control signal, determining by the embedded controller on whether a power management state of the local apparatus is a power saving state or a working state, wherein, under the power saving state, power supply to the system control chip is stopped;
  under a condition that the power management state is determined to be the working state and the system control chip obtains a control of the local apparatus, activating the first switch unit by the embedded controller to establish the connection between the network unit and the system control chip and to cut off a connection between the network unit and the storage unit, so that the system control chip accesses the storage unit and a data received by the network unit is transferred to the storage unit through the system control chip; and
  under a condition that the power management state is determined to be the power saving state and the embedded controller obtains the control of the local apparatus, activating the first switch unit by the embedded controller to cut off the connection between the system control chip and the network unit and to establish the connection between the network unit and the storage unit, so that the data received by the network unit is directly transferred to the storage unit through the first switch unit.

2. The method as recited in claim 1, wherein the storage unit is a memory card, the first switch unit is coupled to a second switch unit through a first bridge, the second switch unit is coupled to the memory card through a second bridge, and the second switch unit is coupled to the system control chip and the embedded controller, the embedded controller is being used to control a switching of the second switch unit so as to determine whether the system control chip or the embedded controller is to access the memory card;
  wherein under the condition of being determined as already switched to the power saving state, comprises:
    activating the first switch unit to perform the switching by the embedded controller, so that the data is transferred to the first bridge through the first switch unit; and
    activating the second switch unit to perform the switching by the embedded controller, so that the data transferred via the first bridge is transferred to the memory card through the second switch unit.

3. The method as recited in claim 2, wherein under the condition of being determined as already switched to the power saving state, further comprising:
  detecting whether the power management state has ever been switched to the working state within a time segment by a firmware unit of the local apparatus to;
  if the power management state has never been switched to the working state within the time segment, when reaching a preset time point, outputting a first signal from the firmware unit to the system control chip so as to wake up the system control chip, so that the system control chip is able to access the memory card;
  under a condition that the system control chip activates an operating system, transferring all the data in the memory card into a built-in storage through the second switch unit and deleting the data in the memory card by the system control chip, wherein the built-in storage is coupled to the system control chip; and
  after deleting the data in the memory card, switching the power management state to the power saving state.

4. The method as recited in claim 3, wherein if the power management state has never been switched to the working state within the time segment, when reaching the preset time point, further comprises:
  outputting a second signal from the firmware unit to the embedded controller, so that the embedded controller, after disabling an audio output interface, a video output interface and a light-emitting unit interface, activates the operating system.

5. The method as recited in claim 2, further comprising:
  when the power management state is the working state, activating the first switch unit to perform the switching by the embedded controller, so that the data is transferred to the system control chip through the first switch unit, and activating the second switch unit to perform the switching by the embedded controller, so that the system control chip accesses the memory card through the second switch unit.

6. The method as recited in claim 5, when the power management state is switched to the working state, further comprising:
   checking whether a remaining capacity of the memory card is smaller than a default capacity by the system control chip;
   if the remaining capacity is smaller than the default capacity, transferring all the data in the memory card to a hard disk coupled to the system control chip and deleting the data in the memory card by the system control chip.

7. The method as recited in claim 1, wherein the storage unit is a built-in storage, the first switch unit is coupled to a second switch unit through a first bridge, the system control chip is coupled to the second switch unit through a third switch unit and a third bridge, and the third switch unit is coupled to the built-in storage;
   under the condition of being determined as already switched to the power saving state, further comprises:
   activating the first switch unit to perform the switching by the embedded controller, so that the data is transferred to the first bridge through the first switch unit;
   activating the second switch unit to perform a switching by the embedded controller, so that the data transferred via the first bridge is transferred to the third bridge through the second switch unit; and
   activating the third switch unit to perform a switching by the embedded controller, so that the data transferred via the third bridge is transferred to the built-in storage through the third switch unit.

8. The method as recited in claim 7, further comprising:
   when the power management state is the working state, activating the first switch unit to perform the switching by the embedded controller, so that the data is transferred to the system control chip through the first switch unit, and activating the third switch unit to perform the switching by the embedded controller, so that the system control chip accesses the built-in storage through the third switch unit.

9. A local apparatus, comprising:
   a network unit communicating with a cloud server;
   an embedded controller coupled to the network unit for receiving a remote control signal from the cloud server;
   a system control chip; and
   a first switch unit coupled to a storage unit, the embedded controller, the system control chip and the network unit, and configured to determine a connection relation between the system control chip and the network unit;
   wherein, when the embedded controller receives the remote control signal through the network unit from the cloud server, the embedded controller determines whether the a power management state of the local apparatus is a power saving state or a working state, wherein, under the power saving state, power supply to the system control chip is stopped,
   under a condition that the power management state is determined to be in the working state and the system control chip obtains a control of the local apparatus, the embedded controller activates the first switch unit to establish a connection between the system control chip and the network unit and to cut off a connection between the network unit and the storage unit, so that the system control chip accesses the storage unit and a data receiving by the network unit is transferred to the storage unit through the system control chip,
   under a condition that the power management state is determined to be the power saving state and the embedded controller obtains the control of the local apparatus, the embedded controller activates the first switch unit to cut off the connection between the system control chip and the network unit and to establish the connection between the network unit and the storage unit, so that the data received by the network unit is directly transferred to the storage unit through the first switch unit.

10. The local apparatus as recited in claim 9, wherein the storage unit is a memory card, and the local apparatus further comprises:
    a second switch unit coupled to the system control chip and the embedded controller;
    a first bridge coupled between the first switch unit and the second switch unit; and
    a second bridge coupled between the second switch unit and the memory card;
    wherein, under the condition of being determined as already switched to the power saving state, the embedded controller activates the first switch unit to switch, so that the data is transferred to the first bridge through the first switch unit, and the embedded controller activates the second switch unit to switch, so that the data transferred via the first bridge is transferred to the memory card through the second switch unit.

11. The local apparatus as recited in claim 10, further comprising:
    a firmware unit coupled to the system control chip and the embedded controller; and
    a peripheral switch unit coupled between the system control chip and the embedded controller, and is coupled to an audio output interface, a video output interface and a light-emitting unit interface;
    wherein, when the firmware unit determines that the power management state has never been switched to the working state within a time segment under the power saving state, and when a preset time point is reached, the firmware unit outputs a first signal to the system control chip to wake up the system control chip, so that the system control chip is able to access the memory card, and the firmware unit outputs a second signal to the embedded controller, so that the embedded controller, after disabling the audio output interface, the video output interface and the light-emitting unit interface via the peripheral switch unit, activates an operating system;
    under a condition that the operating system is activated, the system control chip transfers all the data in the memory card into a built-in storage through the second switch unit and deletes the data in the memory card, wherein the built-in storage is coupled to the system control chip, and after the data in the memory card is deleted, the power management state is switched to the power saving state.

12. The local apparatus as recited in claim 10, wherein when the power management state is the working state, the embedded controller activates the first switch unit to switch, so that the data is transferred to the system control chip through the first switch unit, and the embedded controller activates the second switch unit to switch, so that system control chip accesses the memory card through the second switch unit;
    if the system control chip detects that a remaining capacity of the memory card is smaller than a default capacity, the system control chip transfers all the data in the memory card to a built-in storage coupled to the system control chip and deletes the data in the memory card.

13. The local apparatus as recited in claim 9, wherein the storage unit is a built-in storage, and the local apparatus further comprises:
a second switch unit;
a third switch unit coupled to the built-in storage;
a first bridge coupled between the first switch unit and the second switch unit; and
a third bridge coupled between the second switch unit and the third switch unit;
under the condition of being determined as already switched to the power saving state, the embedded controller activates the first switch unit to switch, so that the data is transferred to the first bridge through the first switch unit; the embedded controller activates the second switch unit to switch, so that the data transferred via the first bridge is transferred to the third bridge through the second switch unit; and the embedded controller activates the third switch unit to switch, so that the data transferred via the third bridge is transferred to the built-in storage through the third switch unit.

14. The local apparatus as recited in claim 13, wherein when the power management state is under the working state, the embedded controller activates the first switch unit to switch, so that the data is transferred to the system control chip through the first switch unit, and the embedded controller activates the third switch unit to switch, so that the system control chip accesses the built-in storage through the third switch unit.

* * * * *